US009860322B2

(12) United States Patent
Bashir et al.

(10) Patent No.: US 9,860,322 B2
(45) Date of Patent: Jan. 2, 2018

(54) STATELESS TECHNIQUE FOR DISTRIBUTING DATA UPLOADS

(71) Applicant: Apple Inc., Cupertino, CA (US)

(72) Inventors: Ahmed M. Bashir, Saratoga, CA (US); Theodore Hong, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 263 days.

(21) Appl. No.: 14/692,661

(22) Filed: Apr. 21, 2015

(65) Prior Publication Data

US 2016/0301619 A1    Oct. 13, 2016

Related U.S. Application Data

(60) Provisional application No. 62/144,807, filed on Apr. 8, 2015.

(51) Int. Cl.
*H04L 29/08* (2006.01)

(52) U.S. Cl.
CPC ........ *H04L 67/142* (2013.01); *H04L 67/1097* (2013.01)

(58) Field of Classification Search
CPC .. H04L 67/142; H04L 67/1097; H04L 47/527
See application file for complete search history.

(56) References Cited

U.S. PATENT DOCUMENTS

| 8,359,223 | B2 | 1/2013 | Chi et al. | |
|---|---|---|---|---|
| 9,032,081 | B1* | 5/2015 | North | H04L 67/1004 709/225 |
| 2009/0132543 | A1* | 5/2009 | Chatley | G06F 3/0613 |
| 2010/0333116 | A1 | 12/2010 | Prahlad et al. | |
| 2013/0311612 | A1* | 11/2013 | Dickinson | G06F 17/301 709/219 |
| 2014/0351400 | A1 | 11/2014 | Madani et al. | |

* cited by examiner

*Primary Examiner* — Kim T Nguyen
(74) *Attorney, Agent, or Firm* — Downey Brand LLP (57) ABSTRACT

The embodiments set forth a technique for providing a stateless technique for distributing uploads. According to some embodiments, a system can include various computing devices, authorization servers, and storage destinations. Within the system, an authorization server assigns weight properties to each storage destination, and generates a set of tokens for subsequent assignment to the different storage destinations in accordance with their weight properties. More specifically, the authorization server is configured to perform an initial token drafting process that involves assigning the tokens to different storage destinations. As the current health of each storage destination changes over time, the authorization server is also configured to periodically perform (e.g., at a set interval) a supplemental token drafting process that involves updating the weight properties of each storage destination and redistributing the tokens in view of the updated weight properties.

20 Claims, 8 Drawing Sheets

STATELESS TECHNIQUE FOR DISTRIBUTING DATA UPLOADS

CROSS-REFERENCE TO RELATED APPLICATIONS

The present application claims the benefit of U.S. Provisional Application No. 62/144,807, entitled "STATELESS TECHNIQUE FOR DISTRIBUTING DATA UPLOADS" filed Apr. 8, 2015, the content of which is incorporated herein by reference in its entirety for all purposes.

FIELD

The described embodiments set forth a stateless technique for distributing data uploads from computing devices to cloud storage.

BACKGROUND

The proliferation of client computing devices—such as smart phones and tablets—has drastically changed the manner in which software applications are designed and executed. Some software applications—such as games—are designed to run independently on the client computing device and require little or no interaction with a server. In contrast, some software applications—such as photo sharing applications and data backup applications—rely on accessing server computing devices that are designed to interact with the software applications. For example, many existing computing devices are configured to upload new data at regular intervals so that users can easily synchronize their data across other devices, or easily recover/transition their data when new computing devices are acquired.

Notably, the considerable scale of computing devices has presented new challenges with respect to reliably providing services to the computing devices. For example, some regions can include a large number of computing devices (e.g., on the order of millions) seeking to upload data to a relatively small number of servers (e.g., on the order of thousands), which can often result in overloaded servers especially when taking expected server failure rate into account. Accordingly, there exists a need to provide an architecture that can dependably and flexibly provide services even in situations where hardware failures and connectivity issues occur on a regular basis.

SUMMARY

The embodiments set forth a technique for providing a stateless technique for distributing uploads. According to some embodiments, a system can include various computing devices, authorization servers, and storage destinations. Within the system, an authorization server assigns weight properties to each storage destination, and generates a set of tokens for subsequent assignment to the different storage destinations in accordance with their weight properties. More specifically, the authorization server is configured to perform an initial token drafting process that involves assigning the tokens to different storage destinations. As the current health of each storage destination changes over time, the authorization server is also configured to periodically perform (e.g., at a set interval) a supplemental token drafting process that involves updating the weight properties of each storage destination and redistributing the tokens in view of the updated weight properties.

One embodiment sets forth a method for distributing data uploads from the perspective of an authorization server configured to interface with a plurality of computing devices and a plurality of storage destinations. The method includes the steps of (1) generating a plurality of tokens, wherein each token includes a unique token identifier (ID) and a reference to a storage destination of the plurality of storage destinations, and the reference to the storage destination is initially unassigned, and (2) for each storage destination of the plurality of storage destinations: (i) assigning, to the storage destination, a weight property that is commensurate with an initial performance capability of the storage destination, and (ii) assigning, to the storage destination, a number of tokens from the plurality of tokens, wherein the number of tokens corresponds to the assigned weight property.

Another embodiment sets forth a method for distributing data uploads from the perspective of a storage destination configured to interface with a plurality of computing devices and an authorization server. The method includes the steps of (1) receiving, from the authorization server, an indication of a number of token requests to be issued by the storage destination, (2) establishing a pseudorandom number generator, wherein a unique identifier (ID) associated with the storage destination is used as a seed for the pseudorandom number generator, and (3) for each token request: (i) issuing, to the authorization server, a request for a token, wherein the request includes a next value produced by the pseudorandom number generator, and (ii) receiving, from the authorization server, a notification that indicates whether the token is assigned to the storage destination.

Yet another embodiment sets forth a system configured to distribute data uploads. The system includes a plurality of computing devices, a plurality of storage destinations, and at least one authorization server, where the at least one authorization server is configured to carry out steps that include: (1) generating a plurality of tokens, wherein each token includes a unique token identifier (ID) and an unassigned reference to a storage destination of the plurality of storage destinations, and (2) for each storage destination of the plurality of storage destinations: (i) assigning, to the storage destination, a weight property that is commensurate with an initial performance capability of the storage destination, and (ii) assigning, to the storage destination, a number of tokens from the plurality of tokens, wherein the number of tokens corresponds to the assigned weight property.

Other embodiments include a non-transitory computer readable medium configured to store instructions that, when executed by a processor, cause the processor to implement any of the foregoing steps.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Other aspects and advantages of the embodiments described herein will become apparent from the following detailed description taken in conjunction with the accompanying drawings which illustrate, by way of example, the principles of the described embodiments.

BRIEF DESCRIPTION OF THE DRAWINGS

The included drawings are for illustrative purposes and serve only to provide examples of possible structures and arrangements for the disclosed inventive apparatuses and methods for providing wireless computing devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

The embodiments set forth herein disclose techniques for providing a stateless technique for distributing uploads. According to some embodiments, a system can include various computing devices, authorization servers, and storage destinations. According to some embodiments, the computing devices can represent smartphones, tablets, laptops, etc., where each computing device is configured to interface with the authorization servers/storage destinations (e.g., via the Internet) when the computing device is seeking to upload data for storage. The authorization servers can represent server devices that are configured to receive upload requests from the computing devices and direct the computing devices to appropriate storage destinations. The storage destinations can represent server devices that are configured to receive and store uploaded data into a corresponding storage (e.g., a high-capacity storage array).

According to some embodiments, each computing device can execute an upload manager that is configured to interface with authorization servers and storage destinations. The upload manager can be configured to receive upload requests from different applications (e.g., user applications) executing on the computing device, and, for each upload request, interface with an authorization server to identify an appropriate storage destination to handle the upload request.

In some embodiments, the upload manager is configured to identify a user account associated with the computing device on which the upload manager is executing, and to accompany each upload request with information associated with the user account. According to this approach, an authorization server is configured to receive an upload request, and, in accordance with a current configuration of the storage destinations, provide, to the computing device, a network address (e.g., a Uniform Resource Locator (URL)) of an appropriate storage destination for handling the upload request. Upon a receipt of the network address, the computing device can interface directly with the storage destination and upload data to the storage destination.

According to some embodiments, the authorization server can implement a distribution manager that is configured to establish and maintain a configuration that balances the operating responsibilities of the storage destinations. According to one embodiment, the distribution manager implements this configuration by (1) assigning weight properties to each storage destination, and (2) distributing tokens to the storage destinations (in accordance with their weight properties) through a token drafting process. The weight properties can be used by the distribution manager to dynamically track, for each storage destination, known (i.e., expected) capabilities of the storage destination in comparison to current (i.e., actual) capabilities of the storage destination. The current capabilities can contrast the known capabilities for a variety of reasons, e.g., bandwidth bottlenecks, hardware failures, Internet access issues, and the like. The distribution manager also can be configured to periodically identify/calculate, for each storage destination, a current health score that represents the current capabilities of the storage destination, which can influence the values of the weight properties. In turn, the updated weight properties can influence the manner in which the responsibilities of the storage destinations are assigned within the system.

According to some embodiments, the weight properties for each storage destination can include an initial weight, an ideal weight, and a current weight. According to some embodiments, the initial weight for a storage destination represents an initial responsibility of the storage destination (e.g., based on expected hardware/bandwidth capabilities) for handling upload requests in comparison to other storage destinations within the system. The ideal weight represents an ideal responsibility of the storage destination for handling upload requests in view of a current health score of the storage destination. For example, when the current health score for the storage destination indicates no issues (e.g., 99% healthy), the value of the ideal weight is assigned to match the values of the initial weight, as there is no reason the storage destination should handle any more or less of the responsibility in view of its excellent current health score. In some instances, however, when a current health score for a storage destination indicates problems (e.g., 50% healthy), it can be desirable to reduce the responsibilities of the storage destination and correspondingly spread the offloaded responsibilities to other (i.e., standby) storage destinations. To implement this functionality, the current weight—which, as described in greater detail herein, is the actual weight enforced by the distribution manager when balancing the system—can be assigned a value based on mathematical functions applied to the ideal weight. These mathematical functions can include, for example, normalizing the ideal weight, dampening the ideal weight, etc., to reduce and/or prevent abrupt/drastic shifts in the responsibilities of storage destinations that can potentially worsen failure scenarios.

To properly balance the responsibilities of the storage destinations in accordance with their corresponding weights, the distribution manager is further configured to establish a set of tokens that can be used to dynamically map computing devices to storage destinations for properly servicing upload requests. According to some embodiments, each token can include a unique ID (e.g., a sequentially-assigned numerical value) and a reference (e.g., a URL) to a storage destination. Using this approach, each computing device—specifically, the user account assigned to the computing device—can correspond to a token, e.g., by performing a hash function on information associated with the user account, where the result of the hash function corresponds to the unique ID of the token. In this manner, when the distribution manager receives, from a computing device, an upload request, the distribution manager can identify a token to which the computing device corresponds. In turn, the distribution manager can identify, using the reference of the token, the storage destination that should handle the upload request, and provide information (e.g., a URL) back to the computing device, thereby enabling the computing device to interface directly with the storage destination and carry out the upload.

Each storage destination can include a storage manager that is configured to interface with the computing devices—specifically, to receive upload requests from upload managers executing on the computing devices. The storage manager is also configured to interface with authorization servers—specifically, to receive and process requests issued by distribution managers executing on the authorization servers. According to some embodiments, each storage destination can be assigned a unique ID that is provided as a seed value to a pseudorandom number generator available to the storage manager. In this manner, as the unique ID is designed to remain unchanged over time, the sequence of random numbers produced by the pseudorandom number generator is deterministic in nature (i.e., the same sequence of random numbers is produced each time the pseudorandom number generator is seeded with the unique ID). As described in greater detail herein, this approach ultimately results in tokens largely being assigned, at least during normal operating conditions, to the same storage destinations, thereby establishing largely consistent computing device to storage destination affinity. This approach also ultimately results in tokens largely being reassigned, at least during abnormal operating conditions, to the same backup (i.e., standby) storage destinations.

According to some embodiments, to properly account for varying health conditions, each storage destination is configured to manage properties that are periodically provided to authorization servers. The properties can include, for example, performance metrics that indicate whether the storage destination is operating at a full capacity or a reduced capacity. In some embodiments, the storage manager can be configured to calculate a current health score and provide the current health score to authorization servers.

Accordingly, the weight properties, in conjunction with the tokens, can enable the distribution manager to properly balance the responsibilities of the storage destinations in accordance with their capabilities and current health scores. To establish the tokens and perform an initial assignment of the tokens to different storage destinations, the distribution manager is configured to perform an initial token drafting process. As the current health scores of the storage destinations can change over time, the distribution manager is also configured to periodically perform (e.g., at a set interval) a supplemental token drafting process that involves updating the weights in view of current health scores of the storage destinations, and redistribute the tokens in view of the updated current weights.

Accordingly, the foregoing approaches provide techniques for providing a stateless technique for distributing uploads. A more detailed discussion of these techniques is set forth below and described in conjunction with FIGS. 1-2, 3A-3B, 4, 5A-5B, and 6, which illustrate detailed diagrams of systems and methods that can be used to implement these techniques.

Figure 1:
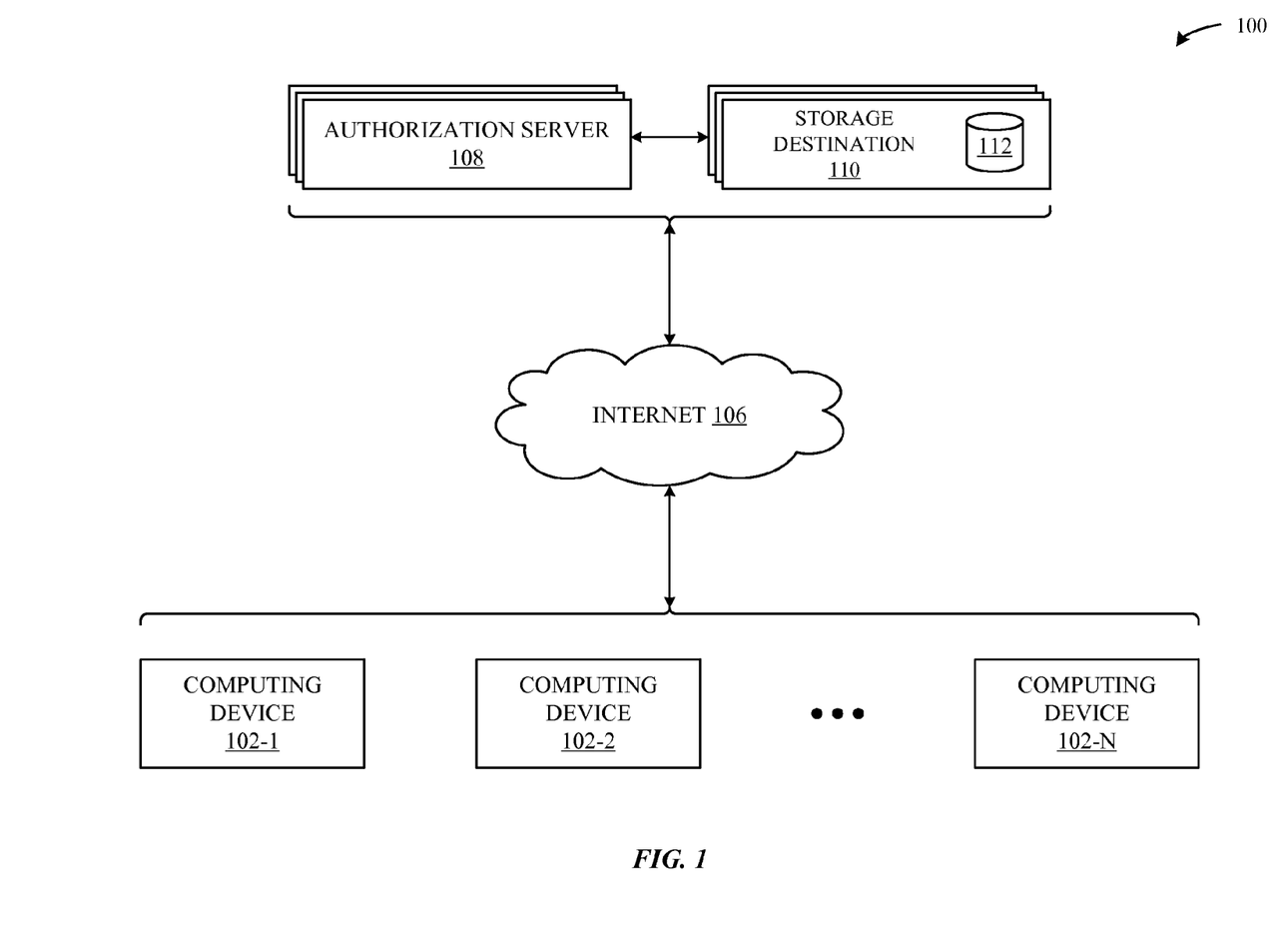
FIG. 1 illustrates a block diagram of different components of a system configured to implement the various techniques described herein, according to some embodiments.

FIG. 1 illustrates a block diagram of different components of a system 100 that is configured to implement the various techniques described herein, according to some embodiments. More specifically, FIG. 1 illustrates a high-level overview of the system 100, which, as shown, includes various computing devices 102, authorization servers 108, and storage destinations 110. According to some embodiments, the computing devices 102 can represent smartphones, tablets, laptops, etc., where each computing device 102 is configured to interface with the authorization servers 108/storage destinations 110 (e.g., via the Internet 106) when the computing device 102 is seeking to upload data for storage. According to some embodiments, the authorization servers 108 can represent server devices that are configured to receive upload requests from the computing devices 102 and direct the computing devices 102 to appropriate storage destinations 110. According to some embodiments, the storage destinations 110 can represent server devices that are configured to receive and store uploaded data into a corresponding storage 112 (e.g., a high-capacity storage array). The specific manner in which the computing devices 102, the authorization servers 108, and the storage destinations 110 operate is described in greater detail below in conjunction with FIGS. 2, 3A-3B, 4, and 5A-5B.

Notably, although FIG. 1 illustrates a single, isolated system 100, multiple instances of the system 100 can be implemented in accordance with the manner in which computing devices 102, authorization servers 108, and storage destinations 110 are configured and/or distributed. For example, a different system 100 can exist for each major region in which a large group of computing devices 102 are concentrated, where the number/capabilities of authorization servers 108 and number/capabilities of the storage destinations 110 corresponds (i.e., scales) to, for example, the number of computing devices 102 that logically fall within the system 100. The manner in which the authorization servers 108 and storage destinations 110 are implemented can also correspond to the typical/expected behavior of the computing devices 102, e.g., the average amount of data each computing device 102 seeks to upload data, the rate at which each computing device 102 seeks to upload data, and the like. The manner in which the authorization servers 108 and storage destinations 110 are implemented can further correspond to different business contracts (e.g., with data storage service providers), bandwidth operating costs/restrictions, etc., that are enforced within the scopes of the different systems 100.

Additionally, it is noted that even when multiple systems 100 are implemented, the systems 100 can be communicatively coupled to one another such that the computing devices 102 (across the different systems 100) are not aware of any separation between the systems 100. For example, data uploaded by a first computing device 102 that logically falls within a first system 100 can be shared with a second computing device 102 that logically falls within a second system 100. Moreover, when the first computing device 102 logically becomes a part of the second system 100 (e.g., when a user of the first computing device 102 travels to a different region), the first computing device 102 can be configured to interface with the authorization servers 108/storage destinations 110 that logically fall within the second system 100. This can beneficially enable computing devices 102 to consume useful services (e.g., data uploading, data sharing, etc.) even when the computing devices 102 migrate between different systems 100, thereby providing enhancements to the overall operating flexibility of the various techniques described herein.

Figure 2:
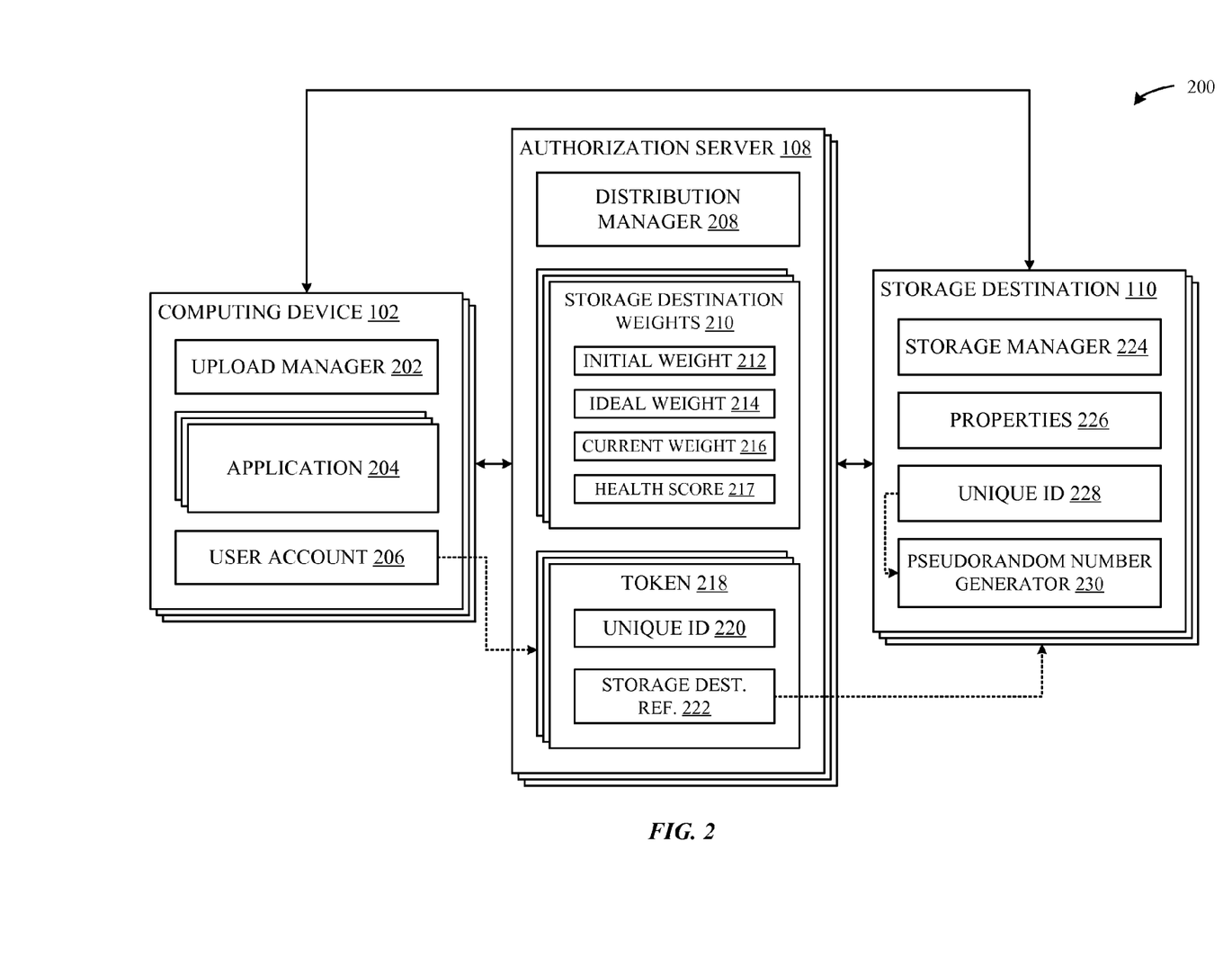
FIG. 2 illustrates a block diagram of a more detailed view of a computing device, an authorization server, and a storage destination of FIG. 1, according to some embodiments.

FIG. 2 illustrates a block diagram of a more detailed view 200 of a computing device 102, an authorization server 108, and a storage destination 110 of FIG. 1, according to some embodiments. Although not illustrated in FIG. 2, it is noted that each computing device 102, authorization server 108, and storage destination 110 can include typical computing hardware resources (e.g., a processor, a memory, a storage, a communications interface, etc.) that enable the respective entity to implement different software components and carry out the various techniques described herein. For example, as shown in FIG. 2, and according to some embodiments, the computing device 102 can execute an upload manager 202 that is configured to interface with authorizations servers 108 and storage destinations 110. The computing device 102 can also execute various applications 204 that represent, for example, operating system (OS) applications (e.g., native applications, kernels, etc.), user applications (e.g., social networking applications, utility applications, etc.), and the like. According to some embodiments, the upload manager 202 can be configured to receive upload requests from the applications 204, and, for each upload request, interface with an authorization server 108 to identify an appropriate storage destination 110 to handle the upload request. More specifically, and according to some embodiments, the upload manager 202 is configured to identify a user account 206 (e.g., username/password) associated with the computing device 102 on which the upload manager 202 is executing, and to accompany each upload request with information associated with the user account 206. According to some embodiments, and as described in greater detail herein, the authorization server 108 is configured to receive the upload request, and, in accordance with a current configuration of the storage destinations 110, provide, to the computing device 102, a network address (e.g., a Uniform Resource Locator (URL)) of an appropriate storage destination 110 for handling the upload request. Upon a receipt of the network address, the computing device 102 can interface directly with the storage destination 110 (using the provided network address) and upload data to the storage destination 110.

As also shown in FIG. 2, the authorization server 108 can implement (i.e., execute) a distribution manager 208 that is configured to establish and maintain a configuration that balances the operating responsibilities of the storage destinations 110. According to one embodiment, the distribution manager 208 implements this configuration using weights 210 and tokens 218. As described in greater detail herein, the weights 210 are used by the distribution manager 208 to dynamically track, for each storage destination 110, known capabilities (e.g., expected bandwidth rate, storage capacity, etc.) of the storage destination 110 in comparison to current capabilities (e.g., actual bandwidth rates) of the storage destination 110. Importantly, the current capabilities can contrast the known capabilities for a variety of reasons, e.g., bandwidth bottlenecks, hardware failures, Internet 106 access issues, and the like. As described in greater detail herein, the distribution manager 208 can be configured to periodically identify/calculate, for each storage destination 110, a current health score 217 that represents the current capabilities of the storage destination 110, and can affect the values of the weights 210. In turn, the updated weights 210 can influence the manner in which the responsibilities of the storage destinations 110 are assigned within the system 100.

As shown in FIG. 2, the weights 210 can include, for each storage destination 110, an initial weight 212, an ideal weight 214, and a current weight 216 that correspond to the storage destination 110. According to some embodiments, the initial weight 212 for a storage destination 110 represents an initial responsibility of the storage destination 110 for handling upload requests in comparison to other storage destinations 110 within the system 100. For example, when five storage destinations 110 exist within the system, and the operating capabilities of the storage destinations 110 are identical, the initial weight 212 for each storage destination 110 can be assigned a value of 20%. The ideal weight 214 represents an ideal responsibility of the storage destination 110 for handling upload requests in view of a current health score 217 of the storage destination 110. For example, when the initial weights 212 of five storage destinations 110 are each assigned the value of 20%, and the current health scores 217 for the storage destinations 110 indicate no issues (e.g., 99% healthy), the values of the ideal weights 214 are assigned to match the values of the initial weights (i.e., 20%), as there is no reason the storage destinations 110 should handle any more or less of the responsibility in view of their excellent current health score 217 of 99%. In some instances, however, when a current health score 217 for a storage destination 110 indicates problems (e.g., 50% healthy), it can be desirable to reduce the responsibilities of the storage destination 110 and correspondingly spread the offloaded responsibilities to other storage destinations 110. To implement this functionality, current weights 216—which, as described in greater detail herein, are the actual weights enforced by the distribution manager 208 when balancing the system 100—can be assigned values based on mathematical functions applied to the corresponding ideal weights 214. These mathematical functions can include, for example, normalizing the ideal weights 214, dampening the ideal weights 214, etc., to reduce or prevent abrupt/drastic shifts in the responsibilities of storage destinations 110 that can potentially worsen scenarios where storage destinations 110 are already experiencing health issues.

As set forth above, to properly balance the responsibilities of the storage destinations 110 in accordance with their corresponding weights 210, the distribution manager 208 is further configured to establish a set of tokens 218 that, as described in greater detail herein, can be used to dynamically map computing devices 102 to storage destinations 110 for properly servicing upload requests. As shown in FIG. 2, and according to some embodiments, each token 218 includes a unique ID 220 (e.g., a sequential numerical value) and a reference 222 (e.g., a URL) to a storage destination 110. According to some embodiments, each computing device 102—specifically, the user account 206 assigned to the computing device 102—can correspond to a unique ID 220 of a token 218, e.g., by performing a hash function on information associated with the user account 206, where the result of the hash function corresponds to the unique ID 220. In this manner, when the distribution manager 208 receives, from a computing device 102, an upload request—which, as set forth above, includes information associated with the user account 206 assigned to the computing device 102—the distribution manager 208 can identify a token 218 to which the computing device 102 corresponds. In turn, the distribution manager 208 can identify, using the reference 222 of the token 218, the storage destination 110 that should handle the upload request, and provide information (e.g., a URL) back to the computing device 102, thereby enabling the computing device 102 to interface directly with the storage destination 110 and carry out the upload.

As further shown in FIG. 2, the storage destination 110 can include a storage manager 224 that is configured to interface with the computing devices 102—specifically, to receive upload requests from upload managers 202 executing on the computing devices 102. The storage manager 224 is also configured to interface with authorization servers 108—specifically, to receive and process requests issued by distribution managers 208 executing on the authorization servers 108. According to some embodiments, each storage destination 110 can be assigned a unique ID 228, which, as shown at step 356 of FIG. 3B, is provided as a seed value to a pseudorandom number generator 230 executing on the storage destination 110. In this manner, as the unique ID 228 is designed to remain unchanged over time, the sequence of random numbers produced by the pseudorandom number generator 230 is deterministic in nature (i.e., the same sequence of random numbers is produced each time the pseudorandom number generator 230 is seeded with the unique ID 228). As described in greater detail herein, this approach ultimately results in tokens 218 largely being assigned, at least during normal operating conditions, to the same storage destinations 110. This approach also ultimately results in tokens 218 largely being reassigned, at least during abnormal operating conditions, to the same backup storage destinations 110.

According to some embodiments, to properly account for varying health conditions, each storage destination 110 is configured to manage properties 226 that are periodically provided to authorization servers 108. The properties 226 can include, for example, performance metrics that indicate whether the storage destination 110 is operating at a full capacity or a reduced capacity. In some embodiments, the storage manager 224 can be configured to calculate a current health score 217 and provide the current health score 217 to authorization servers 108, which, as described above, can be used to update the weights 210 associated with the storage destination 110 on which the storage manager 224 is executing. Alternatively, the authorization servers 108—specifically, the distribution managers 208 executing on the authorization servers 108—can be configured to receive properties 226 from storage destinations 110 and independently calculate current health scores 217 in accordance with the properties 226. It is further noted that establishing current health scores 217/weights 210 of the storage destinations 110 is not confined to the authorization servers 108/storage destinations 110, and that the system 100 can include additional entities configured to provide this functionality.

Accordingly, the weights 210, in conjunction with the tokens 218, can enable the distribution manager 208 to properly balance the responsibilities of the storage destinations 110 in accordance with their capabilities and current health score 217. To establish the tokens 218 and perform an initial assignment of the tokens 218 to different storage destinations 110, the distribution manager 208 is configured to perform an initial token 218 drafting process. A detailed description of the initial token 218 drafting process is described below in greater detail in conjunction with FIGS. 3A-3B. As the current health scores 217 of the storage destinations 110 can change over time, the distribution manager 208 is also configured to periodically perform (e.g., at a set interval) a supplemental token 218 drafting process that involves updating the weights 210 in view of current health scores 217 of the storage destinations 110, and redistribute the tokens 218 in view of the updated weights 210. A detailed description of the supplemental token 218 drafting process is described below in greater detail in conjunction with FIGS. 5A-5B.

Figure 3A:
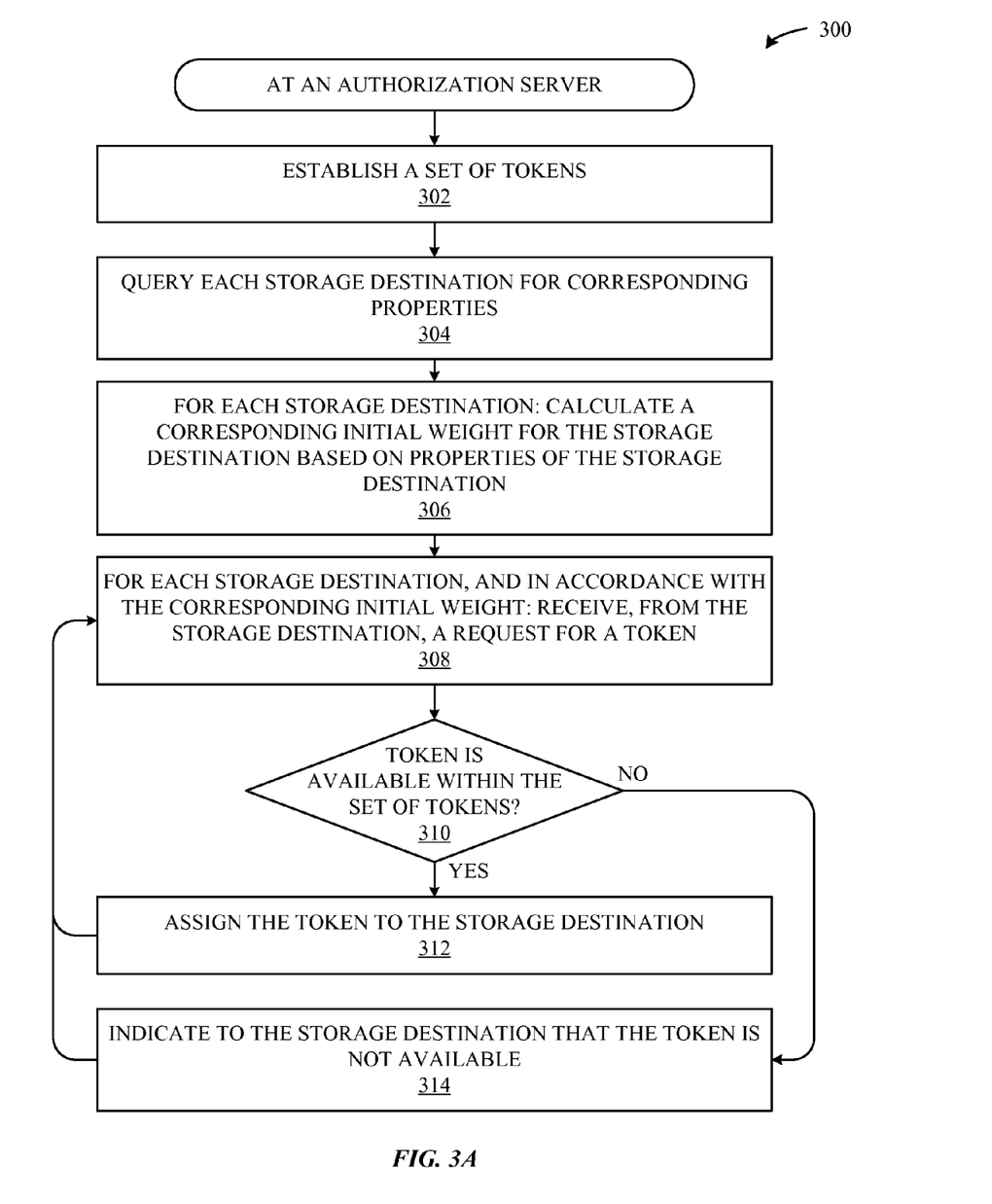
FIGS. 3A-3B illustrates methods for carrying out an initial token drafting process among an authorization server and multiple storage destinations, according to some embodiments.
Figure 3B:
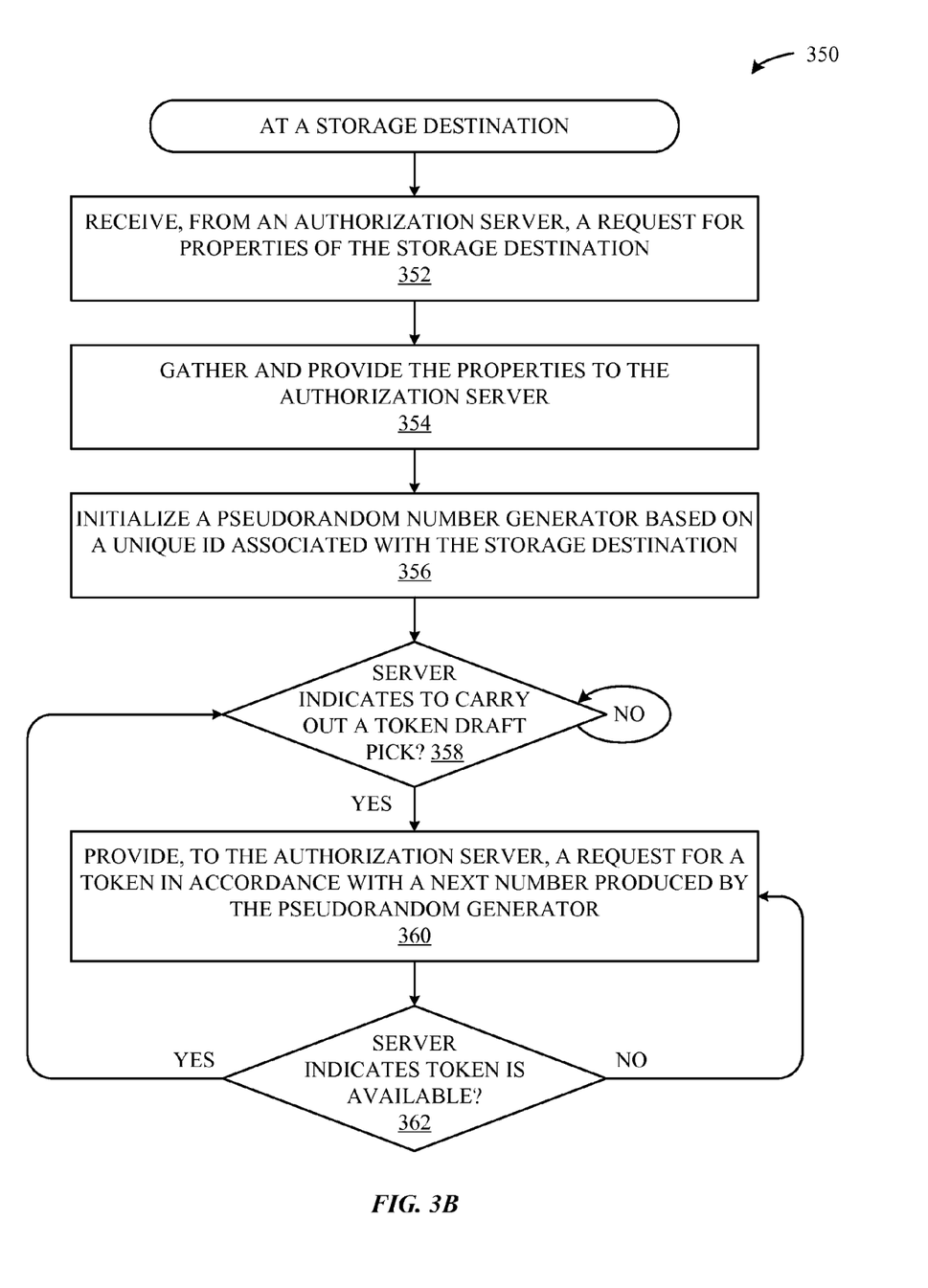

FIGS. 3A-3B illustrates methods 300/350 for carrying out an initial token 218 drafting process among an authorization server 108 and multiple storage destinations 110, according to some embodiments. Specifically, the various steps of the method 300 shown in FIG. 3A are carried out from the perspective of a distribution manager 208 executing on an authorization server 108. Similarly, the various steps of the method 350 shown in FIG. 3B are carried out from the perspective of a storage manager 224 executing on one of the storage destinations 110, and represent counterpart steps to the steps of FIG. 3A.

As shown in FIG. 3A, the method 300 begins at step 302, where the distribution manager 208 establishes a set of tokens 218. According to some embodiments, the number of tokens 218 included in the set of tokens 218 can be configured in accordance with the characteristics of the computing devices 102/storage destinations 110 included within the system 100. For example, using rough numbers, when ten million computing devices 102 and ten storage destinations 110 exist within the system 100, one thousand tokens 218 can be included in the set of tokens 218. When the set of tokens 218 is formed, each unique ID 220 of a token 218 can be assigned a value in accordance with a particular sequence (e.g., 1, 2, . . . , 10,000), and the reference 222 can be left unassigned as the token 218 has not yet been drafted by (i.e., assigned to) a storage destination 110 (and therefore does not correlate to any storage destination 110). According to this example, each token 218 can correspond to a subset of the computing devices 102 included in the system 100 (e.g., ten thousand computing devices 102 of the ten million computing devices 102). Continuing with this example, and assuming that each storage destination 110 has matching performance capabilities (and matching initial weights 212, e.g., 10%), each storage destination 110 will ultimately draft one hundred tokens 218. In this manner, assuming health aspects of the system 100 remain unchanged, each storage destination 110 is configured to service upload requests for one million computing devices 102, thereby promoting an even distribution of responsibility within the system 100. It is noted that the foregoing breakdown is merely exemplary, and that the distribution manager 208 can be configured to establish the set of tokens 218 in accordance with varying factors/properties of the system 100 to promote an initial and proper distribution of responsibilities within the system 100.

At step 304, the distribution manager 208 queries each storage destination 110—specifically, the storage manager 224 executing on the storage destination 110—for corresponding properties 226. Notably, the steps 352-354 of FIG. 3B represent the counterpart steps that are carried out by the storage manager 224 in response to step 304 of FIG. 3A. At step 306, the distribution manager 208 calculates, for each storage destination 110, a corresponding initial weight 212 for the storage destination 110 based on the properties 226 of the storage destination 110. Consider an example scenario in which the system 100 includes five storage destinations 110, where a first one of the storage destinations 110 has substantially greater resources (e.g., bandwidth and storage capacity) than the four other storage destinations 110. In this example scenario, consider further that the distribution manager 208 assigns an initial weight 212 having a value of 40% to the first one of the storage destinations 110, where each of the four remaining storage destinations 110 is assigned an initial weight 212 having a value of 15%. Thus, according to this example scenario, the initial weights 212 would include 40%, 15%, 15%, 15%, and 15%, where, as described in greater detail below, each initial weight 212 can correlate to a number of tokens 218 (established at step 302) that each storage destination 110 will be able to select during the initial token 218 drafting process.

When, at step 304, the initial weights 212 have been established for each of the storage destinations 110, the distribution manager 208, at step 308, begins the initial token 218 drafting process among the storage destinations 110. As shown in FIG. 3A, at step 308, the distribution manager 208 receives, from the storage managers 224 executing on the storage destinations 110, requests for tokens 218. More specifically, and according to one embodiment, the distribution manager 208 can be configured to query each storage destination 110 (as illustrated by step 358 of FIG. 3B), in accordance with the corresponding initial weight 212 assigned to the storage destination 110, to cause the storage destination 110 to issue a request for a particular token included in the set of tokens 218. For example, when one thousand (1,000) tokens 218 are included in the set of tokens 218 generated at step 302, and the example initial weights 212 described above in conjunction with step 304 are intact (i.e., 40%, 15%, 15%, 15%, and 15%), the first one of the storage destinations 110 would be permitted to issue four hundred (400) requests for tokens 218, and each of the other storage destinations 110 would be permitted to issue one hundred fifty (150) requests for tokens 218. The requests can be queried by the distribution manager 208/issued by the storage managers 224 in a round-robin fashion, e.g., a first one of the storage destinations 110 can issue a request for a token 218, then a second one of the storage destinations 110 can issue a request for a token 218, and so on. When a number of tokens 218 commensurate with the initial weight 212 of a storage destination 110 have been assigned to the storage destination 110, the storage destination 110 can cease issuing requests for tokens 218. Any remaining storage destinations 110 can continue issuing requests for tokens 218 until the number of draft picks granted in accordance with the initial weight 212 of the storage destination 110 is exhausted.

As previously described herein, each storage manager 224 is configured to establish a value (i.e., a unique ID 220) for each request for a token 218 through use of the pseudorandom number generator 230, which, as shown at step 360 of FIG. 3B, is initialized with a seed value that corresponds to the unique ID 228 associated with the storage destination 110. It is noted that, in some cases, the storage manager 224 can be configured to carry out a mathematical operation on each value that is generated by the pseudorandom number generator 230. For example, when the unique IDs 220 of the tokens 218 each have a maximum of three digits, and the pseudorandom number generator 230 produces values with six digits, the storage manager 224 can be configured to reduce the values down to three digits, e.g., using a modulo function (or the like), thereby providing a value that is relevant to and aligned with the unique IDs 220 of the tokens 218 established at step 302.

At step 310, the distribution manager 208 determines whether the requested token 218 is available within the set of tokens 218. More specifically, the distribution manager 208 can be configured to identify the value included in the request for the token 218 and attempt to match the value to a unique ID 220 of a token 218 included in the set of tokens 218. In some cases, as a consequence of the usage of the pseudorandom number generators 230, there can be an overlaps in the values that are requested by the storage managers 224. For example, a first one of the storage managers 224 can request a token 218 having a unique ID 220 whose value is thirty-three (33), and, subsequently, another one of the storage managers 224 can issue a similar request. In this example, as the token 218 having the unique ID 220 whose value is thirty-three (33) has already been assigned to another storage destination 110, the distribution manager 208 would deny the request to the storage manager 224. In turn, the storage manager 224 can generate a subsequent request for a different token 218 (e.g., having a next random value generated in accordance with the pseudorandom number generator 230). This process will continue until the storage manager 224 generates a subsequent request for a different token 218 that is available within the set of tokens 218, whereupon a next draft pick for a token 218 can take place in accordance with the sequence established at step 308.

Accordingly, if, at step 310, the distribution manager 208 determines that the token 218 is available within the set of tokens 218, then the method 300 proceeds to step 312, where the distribution manager 208 assigns the token 218 to the storage destination 110. Assigning the token 218 can include, for example, updating the reference 222 with information that corresponds to the storage destination 110 (e.g., a URL of the storage destination 110). Otherwise, the method 300 proceeds to step 314, where the distribution manager 208 indicates to the storage destination 110 that the token 218 is not available, which is further represented by step 362 of FIG. 3B. The method 300 then returns to step 308, which is repeated until each of the storage destinations 110 have been assigned a number of tokens 218 that is commensurate with their initial weight 212.

Accordingly, FIGS. 3A-3B establish a technique for carrying out an initial token 218 drafting process among an authorization server 108 and multiple storage destinations 110, according to some embodiments. When the initial token 218 drafting process is completed, the unique ID 220 and reference 222 of each token 218 are assigned values that enable upload requests issued by computing devices 102—as described below in conjunction with FIG. 4—to be handled in a balanced manner that corresponds to the initial health of the system 100. However, as previously set forth herein, the health of the system 100 can change over time, and it can be necessary to update the weights 210—by way of a supplemental token 218 drafting process, which is described below in conjunction with FIGS. 5A-5B—to continually reflect the current health scores 217 of the storage destinations 110.

Figure 4:
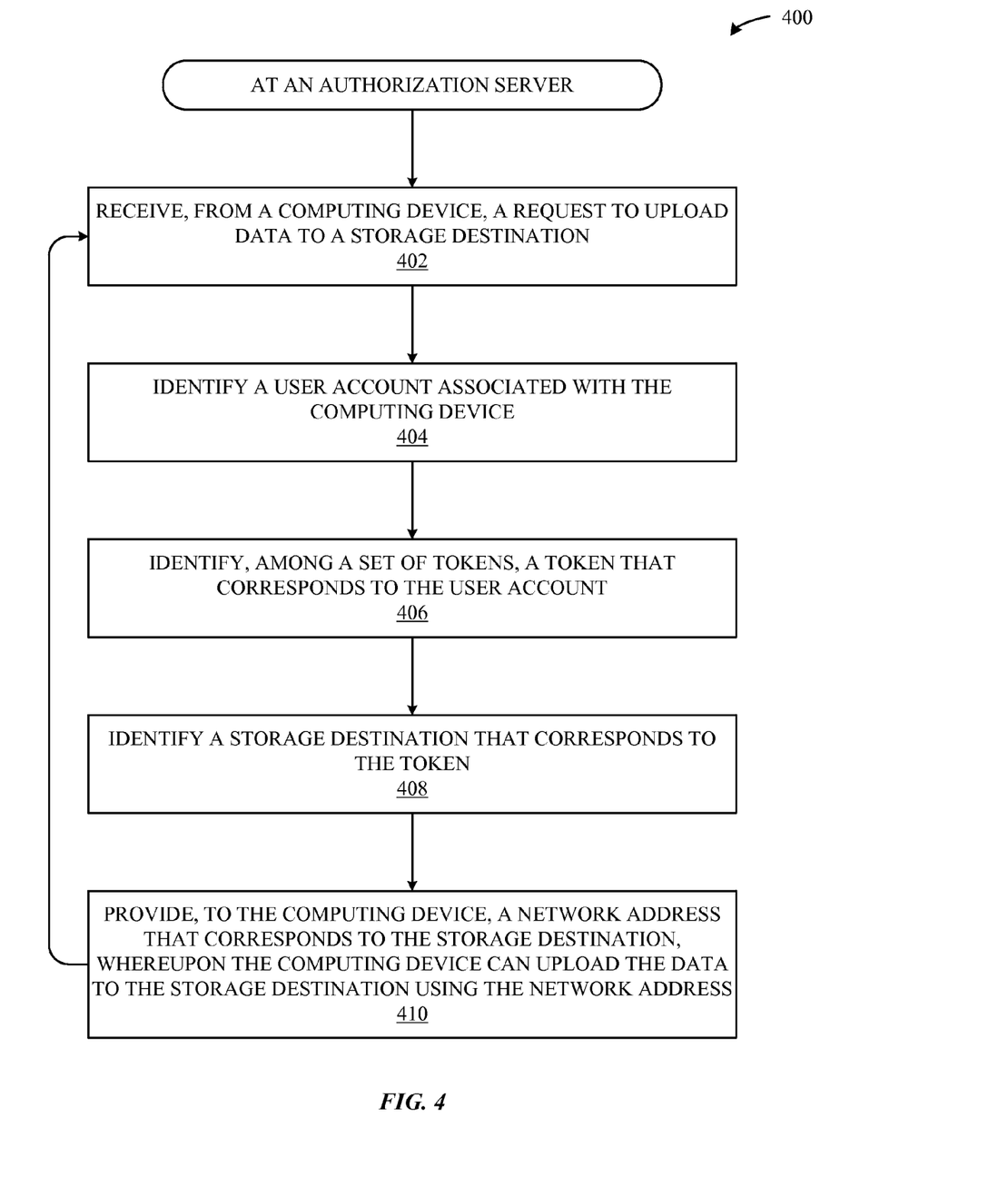
FIG. 4 illustrates a method for handling an upload request issued by an upload manager executing on a computing device of FIG. 1, according to some embodiments.

FIG. 4 illustrates a method 400 for handling an upload request issued by an upload manager 202 executing on a computing device 102, according to some embodiments. As shown, the method 400 begins at step 402, where a distribution manager 208 executing on an authorization server 108 receives, from the computing device 102, a request to upload data to a storage destination 110. The upload manager 202 can issue the request in response to, for example, an application 204 executing on the computing device 102 that desires to upload data into a cloud storage service that is provided by the authorization servers 108/storage destinations 110. At step 404, the distribution manager 208 identifies a user account 206 associated with (i.e., configured on) the computing device 102. According to some embodiments, the distribution manager 208 can parse the request to identify information associated with the user account 206, at least in configurations where the upload manager 202 of the computing device 102 is configured to include the information in upload requests.

At step 406, the distribution manager 208 identifies, among a set of tokens 218 (e.g., the tokens 218 established by way of FIGS. 3A-3B), a token 218 that corresponds to the user account 206. This can be carried out, for example, by performing a mathematical function on the identified information associated with the user account 206. For example, the distribution manager 208 can be configured to carry out a hash function against the identified information to produce a result that maps to the unique ID 220 of a particular token 218 included in the set of tokens 218. Notably, as the user account 206 is designed to remain static over time, the user account 206 will generally correlate to the same token 218, and, in contrast, the reference 222 of the token 218 is dynamic and updated to refer to an appropriate storage destination 110 (e.g., in accordance with changes to current health score 217). At step 408, the distribution manager 208 identifies a storage destination 110 that corresponds to the token 218, e.g., by way of the reference 222 of the token 218 identified at step 406. Finally, at step 410, the distribution manager 208 provides, to the computing device 102, a network address (e.g., a URL) that corresponds to the storage destination 110, whereupon the computing device 102 can upload the data to the storage destination 110 using the provided network address.

As set forth above, FIGS. 3A-3B establish a technique for carrying out an initial token 218 drafting process among an authorization server 108 and multiple storage destinations 110, according to some embodiments. However, as previously set forth herein, the health of the system 100 can change over time, and it can be necessary to update the weights 210—by way of a supplemental token 218 drafting process, which is described below in conjunction with FIGS. 5A-5B—to continually reflect the current health scores 217 of the storage destinations 110.

Figure 5A:
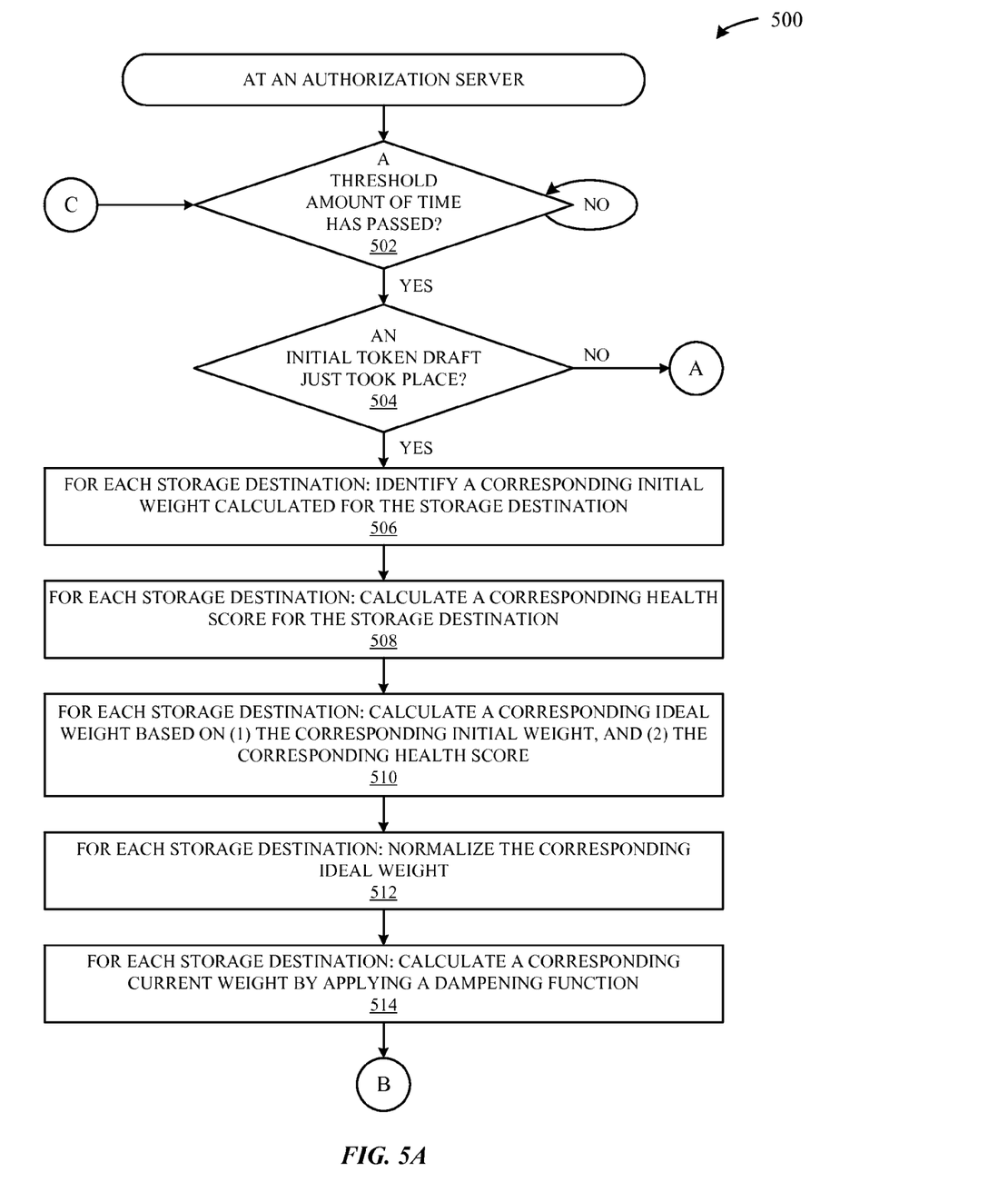
FIGS. 5A-5B illustrate a method for periodically carrying out a supplemental token drafting process, according to some embodiments.
Figure 5B:
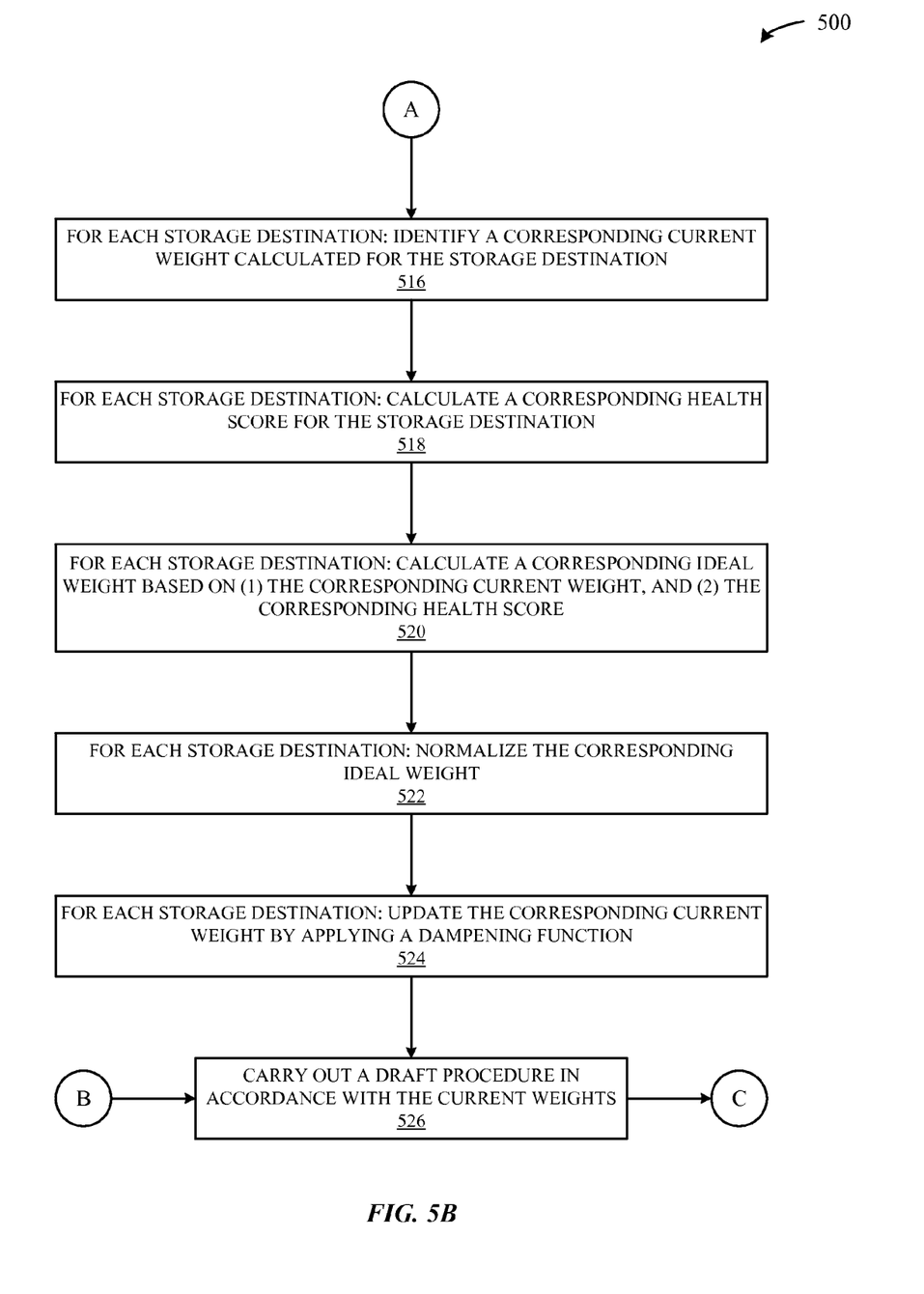

FIGS. 5A-5B illustrate a method 500 for periodically carrying out a supplemental token 218 drafting process, according to some embodiments. As shown, the method 500 begins at step 502, where the distribution manager 208 determines whether a threshold time has passed. The threshold time can be assigned a value, for example, in accordance with an amount of accuracy/responsiveness by why the system 100 reacts to changes in current health scores 217 of the storage destinations 110 (e.g., every minute, every five minutes, etc.). When the threshold amount of time has passed, the method 500 proceeds to step 504, where the distribution manager 208 determines whether an initial token 218 draft just took place—in other words, that an initial token 218 draft has completed, but a supplemental token 218 draft has not yet been carried out. If, at step 504, the distribution manager 208 determines that an initial token 218 draft just took place, then the method 500 proceeds to step 506. Otherwise, the method 500 proceeds to step 516 of FIG. 5B, which is described below in greater detail.

At step 506, the distribution manager 208 identifies, for each storage destination 110, an initial weight 212 calculated for the storage destination 110 (e.g., the initial weights 212 calculated at step 306 of FIG. 3A). At step 508, the distribution manager 208 calculates, for each storage destination 110, a current health score 217 for the storage destination 110. According to one embodiment, the current health score 217 for each storage destination 110 can be based on up-to-date properties 226 received from the storage destination 110, where the up-to-date properties 226 enable the distribution manager 208 to calculate a current health score 217. This can involve, for example, consideration of an overall amount of uptime of the storage destination 110 during a recent time window, hardware performance metrics of the storage destination 110, bandwidth performance metrics of the storage destination 110, and so on. As previously noted herein, other embodiments can involve tasking each storage destination 110—specifically, the storage manager 224 executing on the storage destination 110—to self-calculate a current health score 217 and provide the current health score 217 to the distribution manager 208.

At step 510, the distribution manager 208 calculates, for each storage destination 110, an ideal weight 214 based on (1) the corresponding initial weight 212, and (2) the corresponding current health score 217. According to one embodiment, an ideal weight 214 can be equal to the value of the corresponding initial weight 212 multiplied by the value of the corresponding current health score 217, e.g., $W_{Ideal}=W_{Initial}*Current\_Health\_Score$. Consider, for example, a scenario a first storage destination 110 has an initial weight 212 of 20% and a current health score 217 of 99%, such that the ideal weight 214 is equal to (20%*99%)=~20%. Consider also that a second storage destination 110 has an initial weight 212 of 20% and a current health score 217 of 90%, such that the ideal weight 214 is equal to (20%*90%)=18%. Consider further that a third storage destination 110 has an initial weight 212 of 60% and a current health score 217 of 50%, such that the ideal weight 214 is equal to (60%*50%)=30%. Notably, and in accordance with this example scenario, the ideal weights 214 of the three storage destinations 110 do not provide a comprehensive breakdown of responsibilities, e.g., 20%+18%+30%=68%, and therefore cannot be used in their current state upon the completion of step 510. To cure this deficiency, each of the ideal weights 214 can be normalized such that they provide a comprehensive breakdown of responsibilities.

Accordingly, at step 512, the distribution manager 208 can be configured to normalize the ideal weights 214 calculated at step 510 for each of the storage destinations 110. This can involve, for example, adding each of the ideal weights 214 together to produce a normalization value—e.g., 68% in accordance with the foregoing example scenario—and dividing each ideal weight 214 by the normalization value of 68%. For example, for the first storage destination 110, normalizing the corresponding ideal weight 214 would involve dividing the value of the corresponding ideal weight 214 (20%) by the normalization value (68%) to produce a normalized ideal weight 214 having the value ~29.4%. For the second storage destination 110, normalizing the corresponding ideal weight 214 would involve dividing the value of the corresponding ideal weight 214 (18%) by the normalization value (68%) to produce a normalized ideal weight 214 having the value ~26.5%. For the third storage destination 110, normalizing the corresponding ideal weight 214 would involve dividing the value of the corresponding ideal weight 214 (30%) by the normalization value (68%) to produce a normalized ideal weight 214 having the value ~44.1%. Thus, using this approach, the normalized ideal weights 214 for the three storage destinations 110, when added together (i.e., ~29.4%+~26.4%+~44.1%), produces a result of ~100%.

At step 514, the distribution manager 208 calculates, for each storage destination 110, a corresponding current weight 216 by applying a dampening function. According to some embodiments, the dampening function at step 514 can involve an initial weight 212, an ideal weight 214 (as calculated at step 510), and a dampening factor λ (e.g., 20%), and take on the following form: $W_{Current}=(W_{Initial})*(100\%-\lambda)+(W_{Ideal})*(\lambda)$. For example, for the first storage destination 110, the dampening function at step 514 would involve: (20%)*(100%−20%)+(~29.4%)*(20%)=~21.9%. Similarly, for the second storage destination 110, the dampening function at step 514 would involve: (20%)*(100%−20%)+(~26.5%)*(20%)=~21.3%. Finally, for the third storage destination 110, the dampening function at step 514 would involve: (60%)*(100%−20%)+(~44.1%)*(20%)=~56.8%. Thus, the current weights 216 calculated at step 514, when added together (i.e., ~21.9%+~21.3%+~56.8%) produces a result of ~100%. Finally, upon the completion of step 514, the distribution manager 208 is configured to carry out the supplemental token 218 drafting procedure—e.g., similar to steps 308-314 and 356-362 of FIGS. 3A-3B, respectively—but in accordance with the current weights 216, as reflected at step 526.

Accordingly, FIG. 5A covers a first supplemental token 218 drafting process that occurs after the initial weights 212 are assigned during the initial token 218 drafting process described above in conjunction with FIGS. 3A-3B. Notably, subsequent supplemental token 218 drafting processes will be triggered in accordance with the time interval condition described above at step 502. Specifically, when a second (or later) supplemental token 218 drafting process occurs, e.g., after the completion of step 514 described above, the distribution manager 208 is configured to carry out the steps 516-526 in accordance with FIG. 5B, which are described below in greater detail.

At step 516, the distribution manager 208 identifies, for each storage destination 110, a current weight 216 calculated for the storage destination 110 (e.g., as calculated at the completion of step 514 during a first supplemental token 218 drafting process (i.e., steps 506-514), or as calculated at the completion of step 524 during a second (or later) pass of the method 500. At step 518, the distribution manager 208 calculates, for each storage destination 110, a current health score 217 for the storage destination 110 (e.g., similar to step 508 described above). At step 520, the distribution manager 208 calculates, for each storage destination 110, an ideal weight 214 based on (1) the corresponding current weight 216, and (2) the corresponding current health score 217 (e.g., similar to step 510 described above). Next, at step 522, the distribution manager 208 can be configured to normalize the ideal weights 214 calculated at step 510 for each of the storage destinations 110 (e.g., similar to step 512 described above). At step 524, the distribution manager 208 updates, for each storage destination 110, the corresponding current weight 216 by applying a dampening function. According to some embodiments, the dampening function at step 524 can involve the current weight 216 (prior to the value being updated at step 524), an ideal weight 214 (as calculated at step 520), and a dampening factor $\lambda$ (e.g., 20%), and take on the following form: $W_{Current}=(W_{current})*(100\%-\lambda)+(W_{Ideal})*(\lambda)$. Finally, upon the completion of step 524, the distribution manager 208 is configured to carry out the supplemental token 218 drafting procedure—e.g., similar to steps 308-314 and 356-362 of FIGS. 3A-3B, respectively—but in accordance with the current weights 216, as reflected at step 526.

Figure 6:
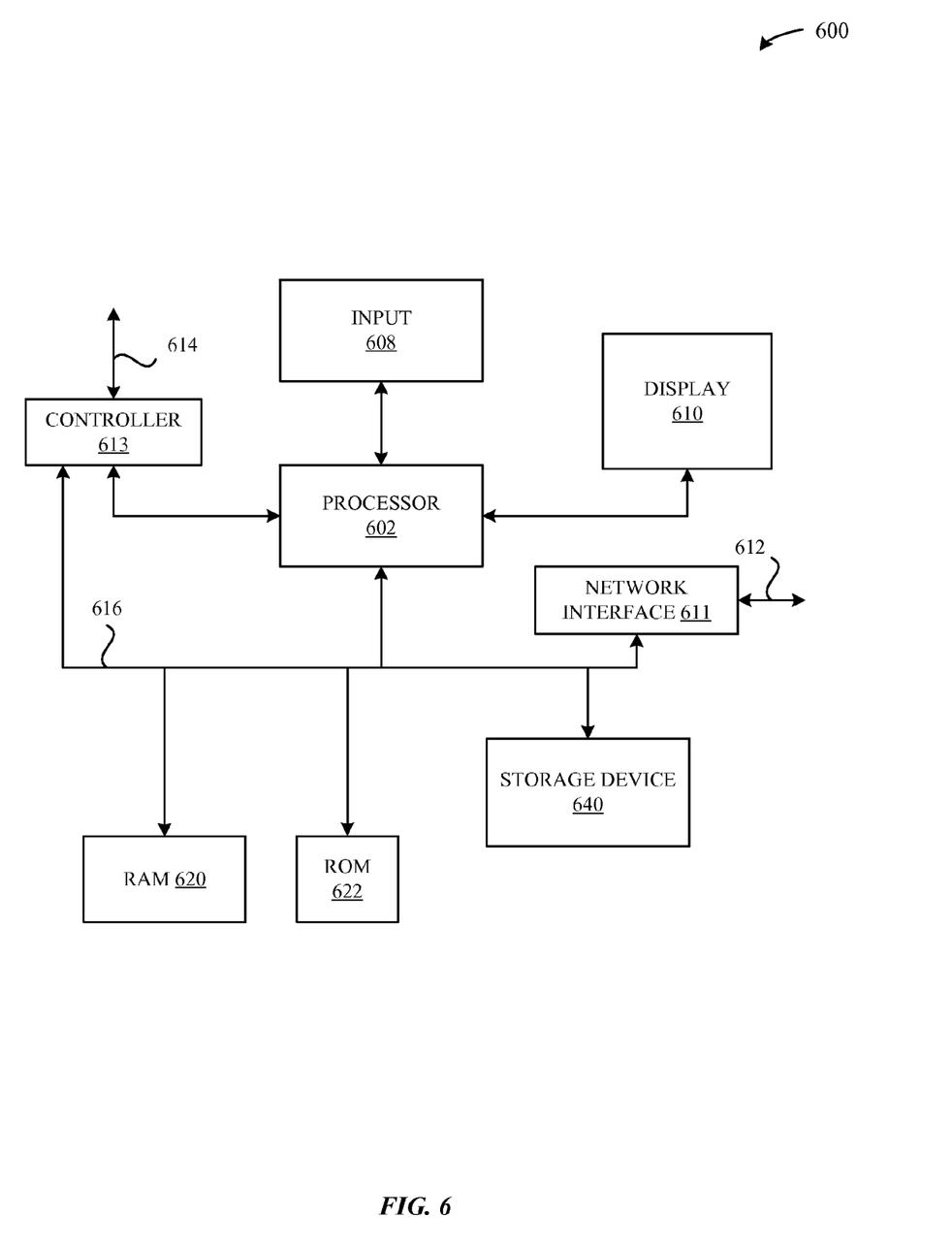
FIG. 6 illustrates a detailed view of a computing device that can be used to implement the various components described herein, according to some embodiments.

FIG. 6 illustrates a detailed view of a computing device 600 that can be used to implement the various components described herein, according to some embodiments. In particular, the detailed view illustrates various components that can be included in the computing devices 102, the authorization servers 108, or the storage destinations 110 illustrated in FIG. 1. As shown in FIG. 6, the computing device 600 can include a processor 602 that represents a microprocessor or controller for controlling the overall operation of computing device 600. The computing device 600 can also include a user input device 608 that allows a user of the computing device 600 to interact with the computing device 600. For example, the user input device 608 can take a variety of forms, such as a button, keypad, dial, touch screen, audio input interface, visual/image capture input interface, input in the form of sensor data, etc. Still further, the computing device 600 can include a display 610 (screen display) that can be controlled by the processor 602 to display information to the user. A data bus 616 can facilitate data transfer between at least a storage device 640, the processor 602, and a controller 613. The controller 613 can be used to interface with and control different equipment through and equipment control bus 614. The computing device 600 can also include a network/bus interface 611 that couples to a data link 612. In the case of a wireless connection, the network/bus interface 611 can include a wireless transceiver.

The computing device 600 also include a storage device 640, which can represent a single disk or a multiple disks (e.g., hard drives), and includes a storage management module that manages one or more partitions within the storage device 640. In some embodiments, the storage device 640 can include flash memory, semiconductor (solid state) memory or the like. The computing device 600 can also include a Random Access Memory (RAM) 620 and a Read-Only Memory (ROM) 622. The ROM 622 can store programs, utilities or processes to be executed in a non-volatile manner. The RAM 620 can provide volatile data storage, and stores instructions related to the operation of the computing device 600.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:
1. A method for distributing data uploads, the method comprising:
at an authorization server configured to interface with a plurality of computing devices and a plurality of storage destinations:

generating a plurality of tokens, wherein each token includes (i) a unique token identifier (ID), and (ii) a reference to a storage destination of the plurality of storage destinations, and the reference to the storage destination is initially unassigned; and for each storage destination of the plurality of storage destinations:
assigning, to the storage destination, a weight property that is commensurate with an initial performance capability of the storage destination, and
assigning, to the storage destination, a first group of tokens from the plurality of tokens, wherein the first group of tokens corresponds to the weight property.

2. The method of claim 1, wherein, for each storage destination of the plurality of storage destinations, assigning the first group of tokens comprises:
updating, for each token in the first group of tokens, the reference to point to the storage destination.

3. The method of claim 1, further comprising:
receiving, from a computing device of the plurality of computing devices, a data upload request, wherein the data upload request includes a unique computing device ID;
identifying, among the plurality of tokens, a token that corresponds to the unique computing device ID; and
providing, to the computing device, the reference to the storage destination in accordance with the token.

4. The method of claim 3, wherein the computing device can utilize the reference to the storage destination to directly upload data to the storage destination.

5. The method of claim 3, wherein identifying the token that corresponds to the unique computing device ID comprises:
performing a mathematical function on the unique computing device ID to produce a result; and
matching the result to the unique token ID included in the token.

6. The method of claim 5, wherein the mathematical function comprises a hash function.

7. The method of claim 1, further comprising:
at a predetermined interval, and for each storage destination of the plurality of storage destinations:
unassigning each token of the plurality of tokens from their corresponding storage destination;
updating the weight property of the storage destination to reflect a current health score of the storage destination; and
assigning, to the storage destination, a second group of tokens from the plurality of tokens, wherein the second group of tokens corresponds to the weight property.

8. The method of claim 7, wherein, for each storage destination, updating the weight property further comprises:
normalizing the weight property against weight properties of other storage destinations; and
dampening the weight property in accordance with a dampening value.

9. A system for distributing data uploads, the system comprising:
a plurality of computing devices;
a plurality of storage destinations; and
at least one authorization server, configured to carry out steps that include:
generating a plurality of tokens, wherein each token includes (i) a unique token identifier (ID), and (ii) a reference to a storage destination of the plurality of storage destinations, and the reference to the storage destination is initially unassigned; and for each storage destination of the plurality of storage destinations:
assigning, to the storage destination, a weight property that is commensurate with an initial performance capability of the storage destination, and
assigning, to the storage destination, a first group of tokens from the plurality of tokens, wherein the first group of tokens corresponds to the weight property.

10. The system of claim 9, wherein, for each storage destination of the plurality of storage destinations, assigning the first group of tokens comprises:
updating, for each token in the first group of tokens, the reference to point to the storage destination.

11. The system of claim 9, wherein the at least one authorization server is further configured to carry out steps that include:
receiving, from a computing device of the plurality of computing devices, a data upload request, wherein the data upload request includes a unique computing device ID;
identifying, among the plurality of tokens, a token that corresponds to the unique computing device ID; and
providing, to the computing device, the reference to the storage destination in accordance with the token.

12. The system of claim 11, wherein the computing device can utilize the reference to the storage destination to directly upload data to the storage destination.

13. The system of claim 11, wherein identifying the token that corresponds to the unique computing device ID comprises:
performing a mathematical function on the unique computing device ID to produce a result; and
matching the result to the unique token ID included in the token.

14. The system of claim 9, wherein the at least one authorization server is further configured to carry out steps that include:
at a predetermined interval, and for each storage destination of the plurality of storage destinations:
unassigning each token of the plurality of tokens from their corresponding storage destination;
updating the weight property of the storage destination to reflect a current health score of the storage destination; and
assigning, to the storage destination, a second group of tokens from the plurality of tokens, wherein the second group of tokens corresponds to the weight property.

15. At least one non-transitory computer readable storage medium configured to store instructions that, when executed by at least one processor included in an authorization server configured to interface with a plurality of computing devices and a plurality of storage destinations, cause the authorization server to distribute data uploads, by carrying out steps that include:
generating a plurality of tokens, wherein each token includes (i) a unique token identifier (ID), and (ii) a reference to a storage destination of the plurality of storage destinations, and the reference to the storage destination is initially unassigned; and
for each storage destination of the plurality of storage destinations:

assigning, to the storage destination, a weight property that is commensurate with an initial performance capability of the storage destination, and assigning, to the storage destination, a first group of tokens from the plurality of tokens, wherein the first group of tokens corresponds to the weight property.

16. The at least one non-transitory computer readable storage medium of claim 15, wherein, for each storage destination of the plurality of storage destinations, assigning the first group of tokens comprises:

updating, for each token in the first group of tokens, the reference to point to the storage destination.

17. The at least one non-transitory computer readable storage medium of claim 15, wherein the steps further include:

receiving, from a computing device of the plurality of computing devices, a data upload request, wherein the data upload request includes a unique computing device ID;

identifying, among the plurality of tokens, a token that corresponds to the unique computing device ID; and providing, to the computing device, the reference to the storage destination in accordance with the token.

18. The at least one non-transitory computer readable storage medium of claim 17, wherein identifying the token that corresponds to the unique computing device ID comprises:

performing a mathematical function on the unique computing device ID to produce a result; and matching the result to the unique token ID included in the token.

19. The at least one non-transitory computer readable storage medium of claim 15, wherein the steps further include:

at a predetermined interval, and for each storage destination of the plurality of storage destinations:

unassigning each token of the plurality of tokens from their corresponding storage destination;

updating the weight property of the storage destination to reflect a current health score of the storage destination; and assigning, to the storage destination, a second group of tokens from the plurality of tokens, wherein the second group of tokens corresponds to the weight property.

20. The at least one non-transitory computer readable storage medium of claim 19, wherein, for each storage destination, updating the weight property further comprises:

normalizing the weight property against weight properties of other storage destinations; and dampening the weight property in accordance with a dampening value.

* * * * *